Nov. 2, 1926.
P. MacKENZIE
1,605,250
HYDRAULIC CONTROLLING VALVE
Filed August 21, 1922    2 Sheets-Sheet 1
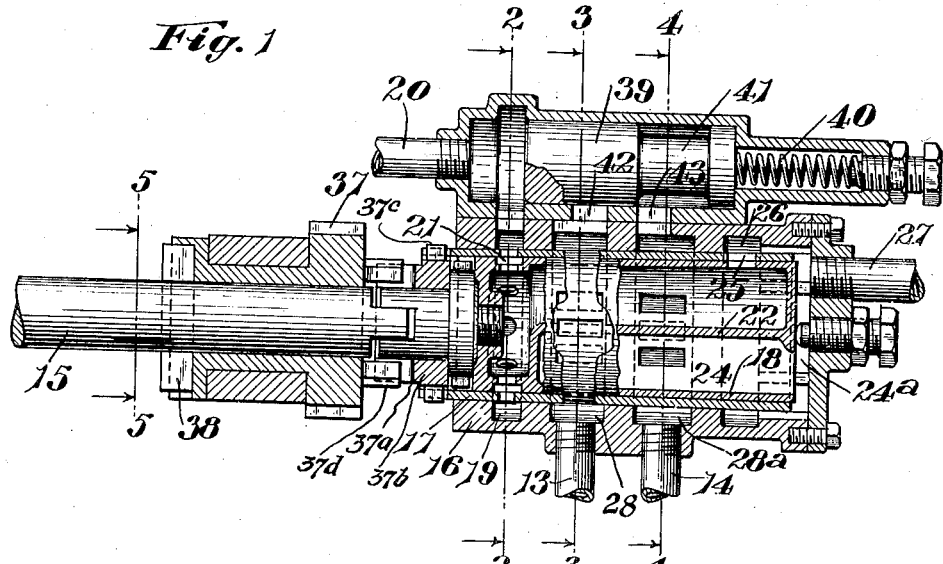
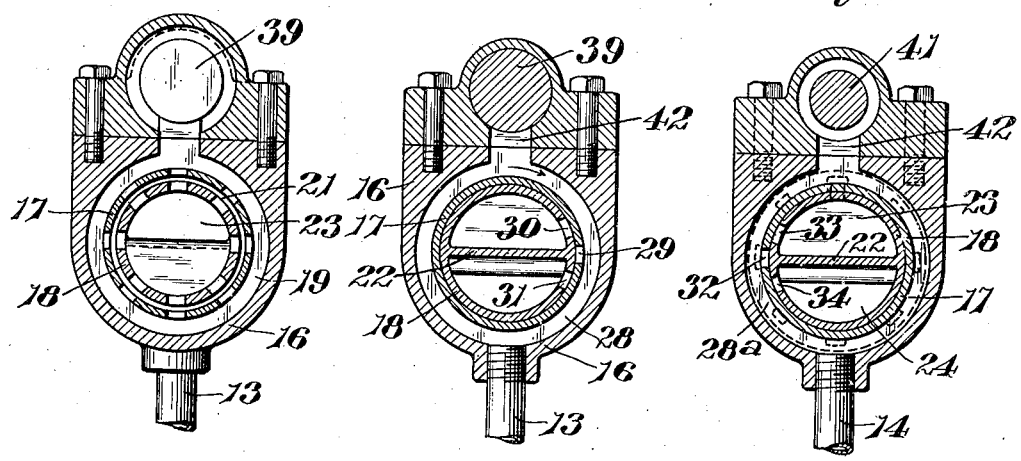
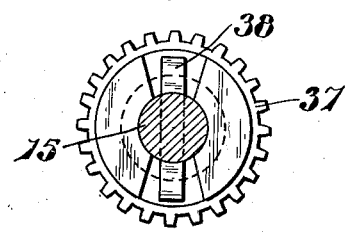
Inventor:
PHILIP MACKENZIE.
By Dewey, Strong,
Townsend and Loftus
Attorneys.

Nov. 2, 1926.  
P. MacKENZIE  
1,605,250  
HYDRAULIC CONTROLLING VALVE  
Filed August 21, 1922   2 Sheets-Sheet 2
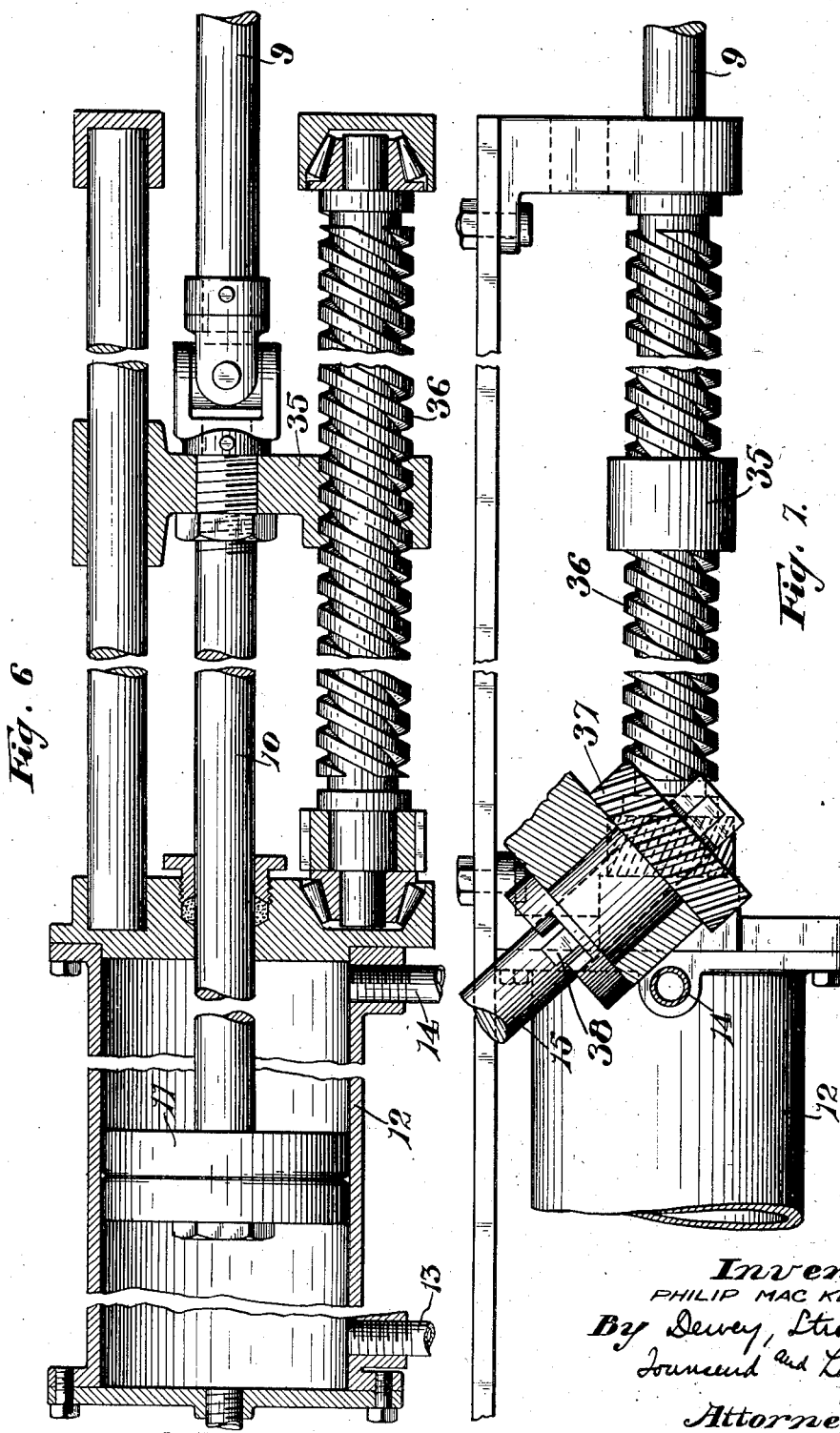
*Inventor.*
PHILIP MAC KENZIE.
By Dewey, Strong,
Townsend and Loftus
*Attorneys.*

Patented Nov. 2, 1926.

1,605,250

UNITED STATES PATENT OFFICE.

PHILIP MacKENZIE, OF SAN FRANCISCO, CALIFORNIA.

HYDRAULIC CONTROLLING VALVE.

Application filed August 21, 1922. Serial No. 583,438.

This invention relates to a fluid pressure steering mechanism for vehicles, and has for its object to simplify and improve the construction and operation of mechanism of this sort.

In carrying out this object I employ an actuator movable in opposite directions for actuating the drag link of the steering wheels and novel valve mechanism for controlling the flow of fluid to either side of the actuator. This valve mechanism comprises a casing having inner and outer rotatable sleeves, the inner sleeve being divided into a pressure chamber and an exhaust chamber, said pressure chamber being in constant communication with the inlet of the valve casing and in communication with the outlet when disposed in neutral position so that fluid from a pump or the like may be circulated through the valve mechanism without affecting the actuator. The exhaust chamber is in constant communication with the outlet of the valve casing and the said sleeves have co-operating ports whereby to place the pressure chamber into communication with either side of the actuator and the exhaust chamber simultaneously into communication with the opposite side of the actuator, so that fluid from the pressure chamber will be directed to one side of the actuator and the opposite side of the actuator will be in communication with the exhaust chamber of the valve mechanism. One of said sleeves is arranged to be rotated by manually operated means and the other sleeve has operative connections with the actuator, so that as soon as the actuator begins to move the connected sleeve will follow up the movement of the manually operated sleeve and close the ports.

One form which my invention may assume is exemplified in the following description and illustrated in the accompanying drawings, in which—

Fig. 1 shows a sectional view of the valve mechanism.

Figs. 2, 3, 4 and 5 show cross sectional views taken on the lines 2—2, 3—3, 4—4 and 5—5 respectively of Fig. 1.

Fig. 6 shows a sectional view of the actuator and its connections with the drag link of the steering wheels.

Fig. 7 shows a side elevation of the parts shown in Fig. 6.

In the mechanism illustrated in the drawings, a drag link 9 is connected to the rod 10 of a piston 11, which latter works within a cylinder 12. Fluid pipes 13 and 14 extend from opposite ends of the cylinder to the valve mechanism carried on the lower end of a steering post 15.

The valve mechanism includes a casing 16, an outer sleeve 17 and an inner sleeve 18, both sleeves being rotatable within the casing. From a pump, not shown, fluid is admitted to an annular channel 19 in the casing through a pipe 20. From this channel the fluid passes through ports 21 formed in the sleeves, said ports being so arranged as to be in constant register regardless of the relative positions of the two sleeves. This is due to the fact that an annular groove is formed around the sleeve 18 at the point where the ports 21 occur. Therefore, fluid entering the ports in the sleeve 17 will enter this annular groove and then pass through the ports into the sleeve 18.

The inner cylinder has an L-shaped partition 22 dividing it into a pressure chamber 23 and an exhaust chamber 24. Ports 25 are formed in the two sleeves at the end opposite the intake and on the pressure side. These ports are adapted to register when the steering mechanism is in neutral position and allow fluid to escape from the pressure chamber into an annular channel 26 in the casing, and thence to a return pipe 27 leading to the pump. The exhaust chamber 24 opens at one end into a space 24ª in the casing, and hence is in constant communication with the return pipe 27.

Where each of the pipes 13 and 14 connects with the valve casing, the latter is formed with an annular channel 28 and 28ª. The sleeves control the inlet or outlet of fluid to and from these channels by an arrangement of ports, which is similar in the case of each channel. Disposed within the channel 28 is a port 29 formed in the outer sleeve, said port being in a line with the partition 22 of the inner sleeve. The inner sleeve has two ports 30 and 31 for co-operation with the said port 29, the ports 30 and 31 being on opposite sides of the partition wall. A port 32 is formed in the outer sleeve on the side opposite the port 29 and opens into the channel 28ª. For co-operation with the port 32 the inner sleeve has ports 33 and 34 arranged on opposite sides of its partition wall.

In the operation of the valve mechanism, when the inner sleeve is turned to the right the port 30 registers with the port 29 and the escape ports 25 are thereupon closed or placed out of register. The fluid passes from the pressure chamber 23 into the channel 28 and thence by pipe 13 into one end of the cylinder. At the same time the port 34 moves into register with the port 32, thereby establishing communication between the pipe 14 and the exhaust chamber of the inner sleeve, so that fluid on the inactive side of the piston will be returned to the pump. This will cause the steering mechanism to be actuated in one direction. An opposite movement of the steering mechanism is obtained by turning the inner sleeve to the left. The inner sleeve is connected to and rotated by the steering post 15.

In order that the piston shall not move the full length of its stroke when the ports are placed in register, I provide for automatically moving the outer sleeve in a direction to follow up the movement of the inner sleeve, and thus close the ports and shorten the movements of the piston. This may be done in a variety of different ways, and in the present instance I show a block 35 connected to the piston rod 10 and threaded on to a worm 36. This worm carries a gear which meshes with a spiral gear 37, which is carried on the steering post and has a certain amount of play by reason of the loose connections 38, shown in Fig. 5.

The spiral gear in turn is connected to the outer sleeve through the medium of a clutch mechanism 37ª. This clutch mechanism comprises a clutch member 37ᵇ rotatably mounted on the shaft 15 and having dogs 37ᶜ engaging notches in the outer sleeve. The spiral gear 37 and the clutch member 37ᵇ are formed with interlocking members 37ᵈ by means of which rotation is imparted from the gear to the clutch member. Thus when the steering post is turned to rotate the inner sleeve and put the working ports into register, the outer sleeve will remain stationary owing to the loose connection, unless, of course, the post be turned a considerable distance, in which case the outer sleeve will follow the inner sleeve, but in such a position as to maintain the ports in register. As soon as the turning of the post ceases the motion of the piston will cause the spiral gear 37 to actuate the outer sleeve and close the ports. For this reason a small movement of the post will give a small amount of movement to the steering wheel, and if it is desired to turn the steering wheels a considerable amount, then the operator merely turns the post a corresponding greater amount.

Should the pump for any reason fail in its operation, I provide for automatically cutting off the circulation of the fluid through the valve mechanism. This cut-off is in the form of a plunger 39 disposed between the inlet pipe 20 and the annular channel 19. The plunger is held in retracted position by the pressure fluid and a spring 40 is placed behind the plunger to advance the same and close the inlet should the fluid pressure fail. When the fluid pressure is cut off the mechanism can be operated by hand, since the turning of the post will actuate the spiral gear 37 and worm 36, which latter will actuate the drag link through the member 35.

The plunger has an attenuated portion 41, which, when the plunger is moved forwardly by the spring 40, occupies a position overlying two ports 42 and 43 formed in the valve casing. These ports communicate with the annular channels 28 and 28ª, so that when the plunger is advanced to cut off the inflow of oil the pipes 13 and 14 are in communication with each other, and, therefore, the piston is free to move back and forth within its cylinder, the oil therein passing freely from one side to the other by reason of the ports 42 and 43.

Various changes in the construction and arrangement of the parts herein shown and described may be employed without departing from the spirit of my invention as disclosed in the appended claims.

Having thus described my invention, what I claim and desire to secure by Letters Patent is:

1. A fluid pressure steering mechanism comprising a cylinder, a piston therein movable in opposite directions, valve mechanism for controlling the flow of fluid to either side of the piston, said valve mechanism including a casing, inner and outer rotatable sleeves in the casing, the inner sleeve being formed with a pressure chamber and an exhaust chamber, said pressure chamber being in constant communication with the inlet of the valve casing and in communication with the outlet thereof when disposed in neutral position and said exhaust chamber being in constant communication with the outlet of the valve casing, said sleeves having co-operating ports whereby to place the pressure chamber into communication with either side of the piston and the exhaust chamber simultaneously into communication with the opposite side of the piston.

2. A fluid pressure steering mechanism comprising a cylinder, a piston therein movable in opposite directions, valve mechanism for controlling the flow of fluid to either side of the piston, said valve mechanism including a casing, inner and outer rotatable sleeves in the casing, the inner sleeve being formed with a pressure chamber and an exhaust chamber, said pressure chamber being in constant communication with the inlet of the valve casing and in communication with the outlet thereof when disposed in neutral positon and said exhaust chamber being in constant communication with the outlet of the valve casing, said sleeves having co-operating ports whereby to place the pressure chamber into communication with either side of the piston and the exhaust chamber simultaneously into communication with the opposite side of the piston, manually operated means to rotate one of said sleeves to cause said ports to register and means operated by the actuator to cause the other sleeve to follow up the movement of the first sleeve and close the ports.

3. A fluid pressure steering mechanism comprising a cylinder, a piston therein movble in opposite directions, valve mechanism for controlling the flow of fluid to either side of the piston, said valve mechanism including a casing, inner and outer rotatable sleeves in the casing, the inner sleeve being formed with a pressure chamber and an exhaust chamber, said pressure chamber being in constant communication with the inlet of the valve casing and in communication with the outlet thereof when disposed in neutral position and said exhaust chamber being in constant communication with the outlet of the valve casing, said sleeves having co-operating ports whereby to place the pressure chamber into communication with either side of the piston and the exhaust chamber simultaneously into communication with the opposite side of the piston, manually operated means for rotating one of said sleeves to cause said ports to register, and means operated by the actuator to cause the other sleeve to follow up the movement of the first sleeve and close the ports, said last-mentioned means including a lost motion gear mounted on the post, said gear being connected to the actuator and to the sleeve.

PHILIP MacKENZIE.